United States Patent [19]
Cumfer

[11] Patent Number: 5,317,960
[45] Date of Patent: Jun. 7, 1994

[54] BREAD TOASTER

[76] Inventor: Donald A. Cumfer, 464 Freeze St., Cookeville, Tenn. 38501

[21] Appl. No.: 978,766

[22] Filed: Nov. 19, 1992

[51] Int. Cl.⁵ .............................................. A47J 37/08
[52] U.S. Cl. ...................................... 99/391; 99/385; 99/393; 99/396; 99/399
[58] Field of Search .......... 99/329 R, 329 P, 329 RT, 99/385, 388, 389, 398, 390–393, 399, 394, 400, 395, 426, 396, 427, 397; 219/411, 413, 492

[56] References Cited

U.S. PATENT DOCUMENTS 2,028,159  1/1936  Kemp ..................................... 99/391
2,941,463  6/1960  DiCuia ................................... 99/393

Primary Examiner—Timothy F. Simone

[57] ABSTRACT

Bread toaster includes a housing with a top opening and a cage for containing bread which is movable through the opening from a loading position outside the housing to a heating position inside the housing. The cage includes a first half and a second half which are hinged to move from an open position outside the housing to a closed position inside the housing in response to movement of the cage from the loading position to the heating position.

7 Claims, 2 Drawing Sheets

BREAD TOASTER

BACKGROUND OF THE INVENTION

The present invention relates to a new type of bread toaster. In particular it relates to apparatus for transporting baked material such as slices of bread or bagels, etc. into the toaster, heating or toasting it/them and returning to the load/unload position.

Presently there are numerous devices on the market for doing the job described above, none of which are entirely satisfactory. With present-day devices, the bread or other material tends to catch upon edges of the machine when the bread is being transported back to the load/unload position. This sometimes leads to burnt toast because the device jams completely. More usually, the bread has to be removed from the device with a knife or fork, sometimes turning the device upside down. In the first place, this is dangerous since most people probably don't disconnect the unit when emptying. In the second place, crumbs fall all over the table or counter from the upended toaster. In the third place, the bread is often shredded and otherwise damaged, still edible but not very appetizing.

SUMMARY OF THE INVENTION

My device will solve all of the above problems plus it will allow a wider variety of baked goods to be heated or toasted in the unit.

I propose to provide a "clam-shell" like cage of a plurality of wires connected to a transport device (elevator) in such a manner that in the raised position, the clam-shell is open, presenting a wide mouth to the user for easy insertion of the desired food. Upon activating the elevator, lowering the baked goods into the machine, the mechanical configuration and clam-like action of the device forces the clam-shell to close around the object within. This wire-basket is positioned in close proximity to heated wires or other heating device, as in a conventional unit. After the item(s) is heated to the desired degree, set by a conventional thermal or timer means, of which there are many, the heat is turned off and the elevator is raised to the load/unload position. In the load/unload position the clam-shell of wires is automatically opened for easy removal of the heated foods. The unit is in position for another operation. By simple addition, several pieces of bread of other foods may be heated or toasted simultaneously.

DETAILED DESCRIPTION OF THE PREFERRED EMBODIMENT

Figure 1A:
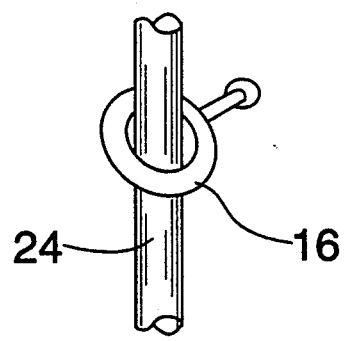
FIG. 1A is an enlarged perspective of the eye bolt which cams the first cage half away from the second cage half.
Figure 1:
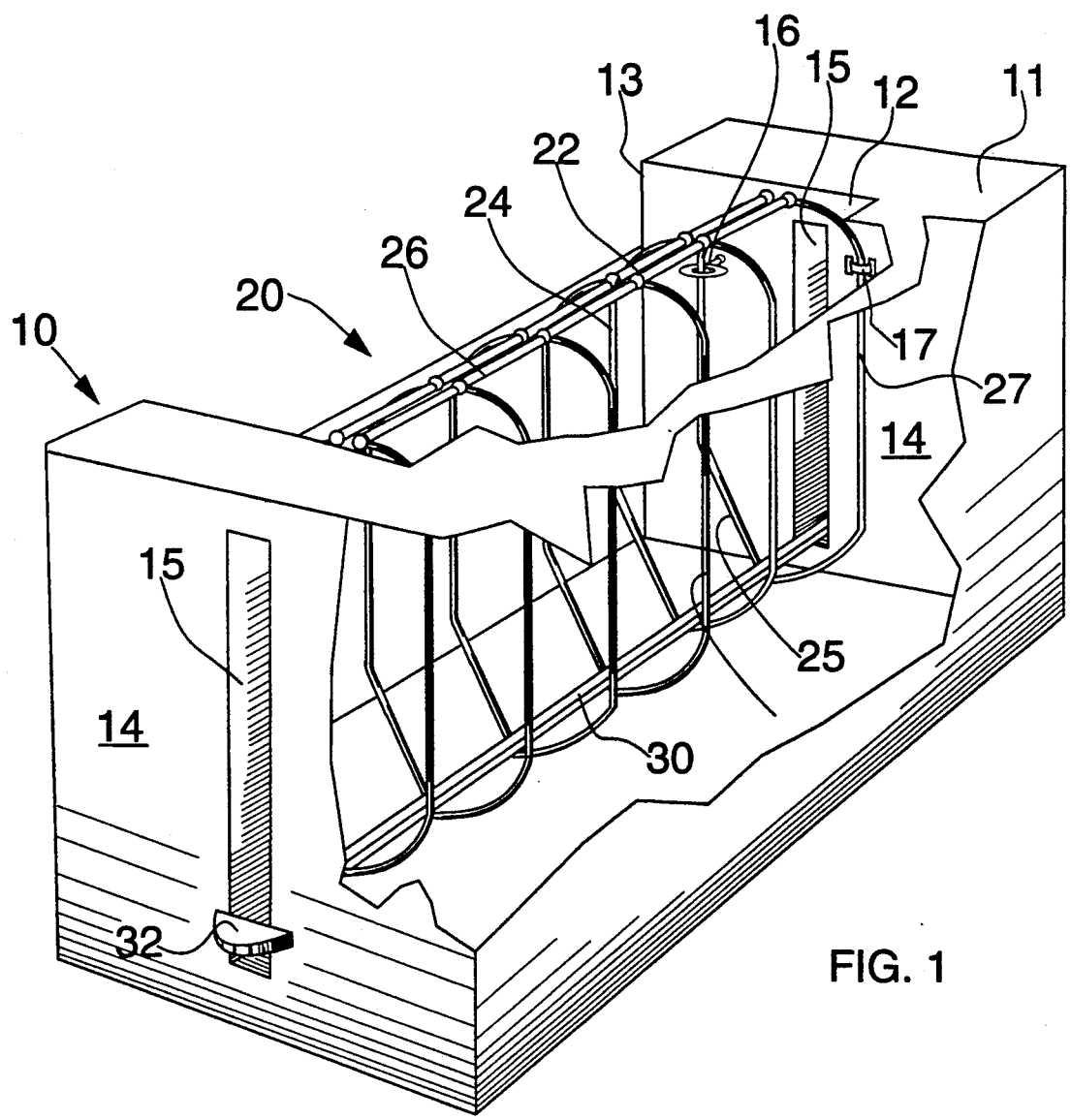
FIG. 1 is a cut away perspective of the bread toaster with the cage in the heating position.

FIG. 1 shows a housing 10 having a top surface 11 with an opening 12, a sidewall 13 which is cut away to enlarge the opening below the top surface, and end walls 14 with vertical elevator guides 15 therein.

A cage 20 includes a first cage half 22 and a second cage half 26 which are connected at a bottom hinge 30 which permits the first cage half 22 to swing away from the second cage half 26. The hinge 30 is guided vertically in a rectilinear direction by elevator guides 15 from an upper or loading position shown in FIG. 2 to the lower or heating position shown in FIG. 1. An elevator operating lever 32 is used to move the cage to the heating position.

The first cage half 22 includes a follower wire 24, 25 which rides through a first cage guide 16 in the form of an eye bolt which swivels relative to the housing and serves as a cam for the following wire. A first wire section 24 is parallel to the rectilinear direction of movement effected by the elevator guide and causes the first cage half 22 to move vertically and parallel to the second cage half 26 during a first stage of movement toward the loading position. A second wire section 25 causes the first cage half 22 to swing away from the second cage half 26 during a second stage of movement. This is facilitated by a second wire section 26 which is considerably longer than the perpendicular distance from the first wire section 24 to the guide 15. In the present embodiment, the second wire section extends from the first wire section to the hinge at an angle of about 30°, thus having a length of twice said perpendicular distance and facilitating a smooth opening movement.

Figure 2:
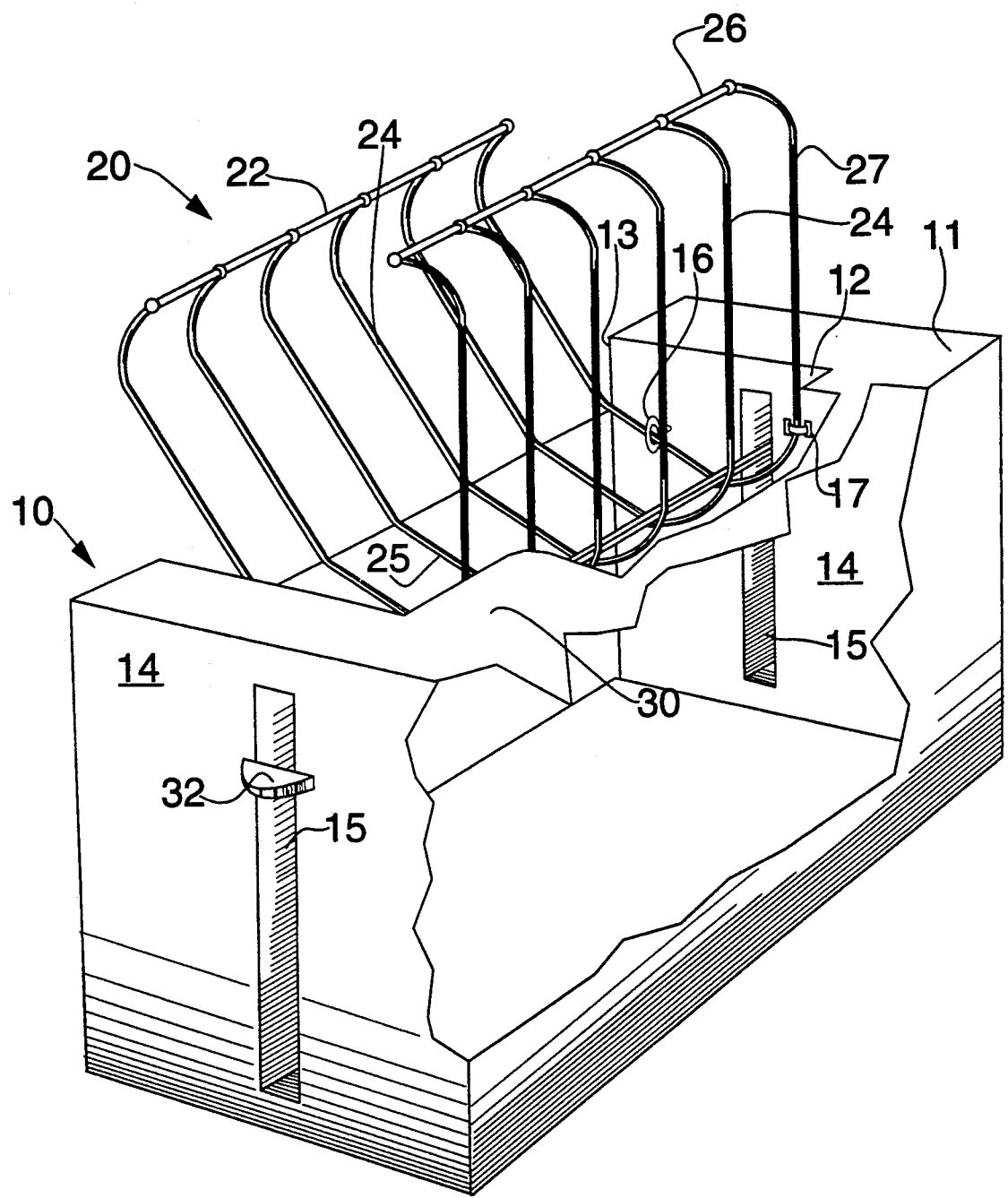
FIG. 2 is a cut away perspective of the bread toaster with the cage in the loading position.

The second cage half 26 includes a wire section 27 which is guided vertically by a cage guide 17 fixed to the endwall. As shown in FIG. 2, the second cage half of this embodiment is not designed to swing away from the vertical plane in which the hinge 30 moves upward.

The foregoing is exemplary and not intended to limit the scope of the claims which follow.

I claim:

1. A bread toaster comprising
a housing having a first opening for loading and unloading food to be heated,
cage means movable through said opening between a heating position inside said housing and a loading position substantially outside said housing, said cage means comprising a first cage half and a second cage half, and
means for moving said first cage half relative to said second cage half from a closed position to an open position in response to movement of said cage means from said heating position to said loading position, and from said open position to said closed position in response to movement of said cage means from said loading position to said heating position.

2. A bread toaster as in claim 1 further comprising a hinge where said first cage half and said second cage half are hinged to be movable relative to each other.

3. A bread toaster as in claim 2 further comprising rectilinear guide means in said housing, said guide means causing said hinge to move in a rectilinear direction as said cage means moves between said heating position and said loading position.

4. A bread toaster as in claim 3 wherein said means for moving comprises cam means fixed to said housing and follower means fixed to said first cage half, said cam means cooperating with said follower means to cause said first cage half to move parallel to said rectilinear direction in a first stage of movement from said heating position to said loading position, and to swing away from said rectilinear direction in a second stage of movement from said heating position to said loading position.

5. A bread toaster as in claim 4 wherein said cam means comprises eye means fixed for swiveling movement relative to said housing, for said follower means comprising a rectilinear first wire section which is parallel to said rectilinear direction when said cage means is in said heating position, and a second wire section which connects said first wire section to said hinge means, said first and second wire sections passing through said eye means.

6. A bread toaster as in claim 4 wherein said second cage half moves parallel to said rectilinear direction.

7. A bread toaster as in claim 4 wherein said housing further comprises a sidewall which is cut away adjacent to said opening to accommodate said first cage half in said open position.

* * * * *